United States Patent
Yang

(10) Patent No.: US 10,525,620 B2
(45) Date of Patent: Jan. 7, 2020

(54) SPREADING DEVICE FOR FOAMING FURNACE

(71) Applicant: ZHEJIANG RUNYANG NEW MATERIALS TECHNOLOGY CO., LTD., Huzhou, Zhejiang Province (CN)

(72) Inventor: Qingfeng Yang, Huzhou (CN)

(73) Assignee: ZHEJIANG RUNYANG NEW MATERIALS TECHNOLOGY CO., LTD., Zhejiang (CN)

(*) Notice: Subject to any disclaimer, the term of this patent is extended or adjusted under 35 U.S.C. 154(b) by 0 days.

(21) Appl. No.: 16/036,478

(22) Filed: Jul. 16, 2018

(65) Prior Publication Data

US 2019/0210256 A1 Jul. 11, 2019

(30) Foreign Application Priority Data

Jan. 11, 2018 (CN) .......................... 2018 1 0025739

(51) Int. Cl.
*B29C 44/20* (2006.01)
*B29C 44/34* (2006.01)
*B29L 7/00* (2006.01)
*B29K 105/04* (2006.01)
*B29K 23/00* (2006.01)
*B29C 44/56* (2006.01)

(52) U.S. Cl.
CPC .......... *B29C 44/353* (2013.01); *B29C 44/203* (2013.01); *B29C 44/5672* (2013.01); *B29K 2023/00* (2013.01); *B29K 2105/04* (2013.01); *B29L 2007/008* (2013.01)

(58) Field of Classification Search
CPC ....... B29C 44/20; B29C 44/203; B29C 44/28; B29C 44/34; B29C 44/35; B29C 44/353; B29C 44/5672
See application file for complete search history.

(56) References Cited

FOREIGN PATENT DOCUMENTS

| CN | 2790731 Y | 6/2006 |
| CN | 102756449 A | 10/2012 |
| CN | 202 607 928 | * 12/2012 |

(Continued)

OTHER PUBLICATIONS

English abstract for CN 202 607 928, dated Dec. 19, 2012.*

*Primary Examiner* — James P Mackey
(74) *Attorney, Agent, or Firm* — AEON Law, PLLC; Adam L. K. Philipp; Jonathan E. Olson

(57) ABSTRACT

The present invention relates to a spreading device for a foaming furnace, including a first spreading component and a second spreading component symmetrically mounted on two sides in a hearth of a foaming furnace. Both the first spreading component and the second spreading component are provided with a spreading roll group composed of at least two spreading rolls, and a driving device for driving the spreading roll group. The spreading device further includes a fixing frame, the fixing frame including a first mounting seat and a second mounting seat. The spreading roll includes a first mounting portion and a second mounting portion. The first mounting portion is rotationally connected to the first mounting seat, and the second mounting portion is rotationally connected to the second mounting seat. The spreading device of the present invention has good stability during work, and significantly improves an unfolding effect.

10 Claims, 5 Drawing Sheets

(56) References Cited

FOREIGN PATENT DOCUMENTS

| CN | 202781848 U | 3/2013 |
| CN | 203228347 U | 10/2013 |
| CN | 205148756 U | 4/2016 |

* cited by examiner

SPREADING DEVICE FOR FOAMING FURNACE

BACKGROUND

Technical Field

The present invention relates to the technical field of foaming furnaces, and more particularly to a spreading device for a foaming furnace.

Related Art

Polyolefin plastics have a wide range of application, have good physical, chemical and mechanical properties, have good toughness, flexibility and buffer properties, have electrical insulation, thermal insulation and other properties, and are widely used in the fields of packaging, chemicals, construction and the like. Polyolefin foamed plastics are widely used and are one of the earliest foamed plastics successfully made.

A current cross-linked polyolefin foaming process mainly includes: kneading and granulating polyolefin raw materials and various aids, adding them into an extruder for plasticizing to obtain a polyolefin master sheet with uniformly mixed components, and then performing foaming through a foaming furnace. Nowadays, there are two general foaming furnaces. In one foaming furnace, a horizontal furnace serves as a preheating section and a foaming section. In the other foaming furnace, a foaming master sheet passes through a horizontal furnace and then is foamed in a vertical furnace. In the second mode, the horizontal furnace mainly provides preheating of a polyolefin master sheet, and after being heated in different temperature intervals, the polyolefin master sheet reaching the vertical furnace has a certain temperature, which is favorable for foaming, thereby improving the foaming quality. The vertical furnace is a foaming section of the polyolefin master sheet, and is a main foaming finishing station. After the polyolefin master sheet enters the vertical furnace, a foaming agent decomposes under the action of high temperature, and bubbles disperse and form polyolefin foams in the master sheet.

When the polyolefin master sheet is foamed in the vertical furnace, expansion may occur in thickness and width, and at this time, the polyolefin master sheet is in a semi-molten state. If it is not unfolded in time, the sheets will overlap and adhere to each other, thereby affecting the quality of a finished product. Therefore, it is necessary to unfold in time through a spreader.

Patent document with the application number of 200520019027.1 discloses such an unfolding mechanism used in a cross-linked polyolefin foaming furnace. There are two unfolding mechanisms which are mounted on two sides of a foaming section of the foaming furnace respectively and have the same structure. Each unfolding mechanism has two unfolding rolls, namely a central roll and a planetary roll. Both the central roll and the planetary roll are composed of a transmission section and a working section. The working section is an extending cantilever in which cooling water is filled. The transmission section of the central roll and the transmission section of the planetary roll are connected through a rotary arm. The planetary roll can rotate around the central roll.

When the unfolding mechanism unfolds a sheet, because the unfolding roll is relatively long, it only depends on the connection and support of the transmission section, so that when the working section is suspended, an end portion is extremely unstable and is likely to vibrate, which seriously affects the unfolding quality of the sheet; and the transmission section is complicated in structure and high in production cost.

SUMMARY

To solve the foregoing problem, the present invention is directed to a spreading device for a foaming furnace. The device has a simple structure, and when the device is mounted on a furnace wall of a foaming furnace for use, a suspended working section of a spreading roll keeps stable without shaking, so that a good sheet unfolding effect is provided.

The technical solution adopted by the present invention for solving the problem is as follows. A spreading device for a foaming furnace is provided. The device includes a first spreading component and a second spreading component symmetrically mounted on two sides in a hearth of the foaming furnace. Both the first spreading component and the second spreading component are provided with a spreading roll group composed of at least two spreading rolls, and a driving device for driving the spreading roll group. The spreading device further includes a fixing frame, the fixing frame including a first mounting seat and a second mounting seat. The spreading roll includes a first mounting portion and a second mounting portion. The first mounting portion is rotationally connected to the first mounting seat, and the second mounting portion is rotationally connected to the second mounting seat.

Preferably, the driving device includes a driving motor group and a transmission shaft, one end of the transmission shaft is connected to the driving motor group, and the other end is mounted on the fixing frame and is connected to the spreading roll group.

Preferably, the driving motor group includes a first motor, and a tail end of the transmission shaft is connected to the first motor.

Preferably, the driving motor group includes a second motor, the transmission shaft is sleeved with a shaft-driven gear, and the shaft-driven gear is connected to a shaft-driving gear on an output shaft of the second motor through a first gear chain.

Preferably, the transmission shaft is externally sleeved with a shaft sleeve, and a connection end of the shaft sleeve passes through the second mounting seat and is connected to the first mounting seat.

Preferably, the first mounting portion and the second mounting portion divide the spreading roll into a working section, a supporting section and a transmission section, the length of the working section is 2 to 3 times that of the supporting section, and the transmission section is sleeved with a roll-driven gear.

Preferably, the transmission shaft is sleeved with a plurality of roll-driving gears, the roll-driven gear on the transmission section of at least one spreading roll is connected to the roll-driving gear on the transmission shaft through a second gear chain, and the roll-driven gears on the transmission sections of the other spreading rolls are meshed with the roll-driving gears on the transmission shaft.

Preferably, the fixing frame is externally sleeved with a thermal insulation layer, and the spreading roll passes through the thermal insulation layer and extends into the foaming furnace.

Preferably, the spreading roll is made of stainless steel.

Preferably, an angle between the spreading roll and a furnace wall of the foaming furnace is greater than or equal to 30°, and the spreading roll is inclined downward relative to a horizontal plane.

The present invention has the, beneficial effects as follows.

1. The fixing frame is added, and the spreading component is connected to the furnace wall of the foaming furnace through the fixing frame, and does not directly contact the furnace wall of the foaming furnace, so as to reduce the frictional wear generated between the rotating spreading roll and the furnace wall, and the damage caused by direct heat transfer between the spreading roll and the high-temperature furnace wall of the foaming furnace.

2. A supporting point and a limiting point are formed at a joint between the mounting portion of the spreading roll and the mounting seat of the fixing frame to stabilize the suspended working section of the spreading roll, so that no jitter occurs during working, thereby improving the unfolding quality of the sheet.

3. The fixing frame isolates a high-temperature working area inside the foaming furnace and a normal-temperature power area outside the foaming furnace, and the supporting section of the spreading roll in the fixing frame provides a temperature transition for a larger temperature difference between the working section and the transmission section of the spreading roll, so that the heated environment on the spreading roll is improved, thereby prolonging the service life of the spreading roll, and reducing the heat loss.

4. The dual-motor drive of the driving motor group is adopted. On the one hand, the driving effect can be improved when dual motors are working at the same time, and meanwhile, when one of the motors fails, the other motor provides power as a standby motor, which does not affect the working effect of the spreading roll. On the other hand, when the dual motors are working at different time, the two motors provide different rotation speeds and different rotation directions respectively, which improves the applicability and practicability of the spreading device.

5. The second motor drives the transmission shaft in a chain transmission manner, the chain transmission has a high carrying capacity, and the driving device has a large transmission efficiency even in a high-temperature foaming environment.

6. The driving motor group drives the transmission shaft, and then drives the spreading roll with the transmission shaft. The two-section transmission mode has a transmission buffer function, so that the driving motor group will not immediately affect the working of the spreading roll when it suddenly fails.

7. At least two spreading rolls are driven by the same transmission shaft to make them rotate synchronously at the same speed in different directions. The structure is simple and the spreading effect is improved.

8. The thermal insulation layer is added to reduce the heat loss in the foaming furnace, thereby saving energy and protecting the environment.

9. The entire device has a simple structure and is convenient for mass production.

Figure 1:
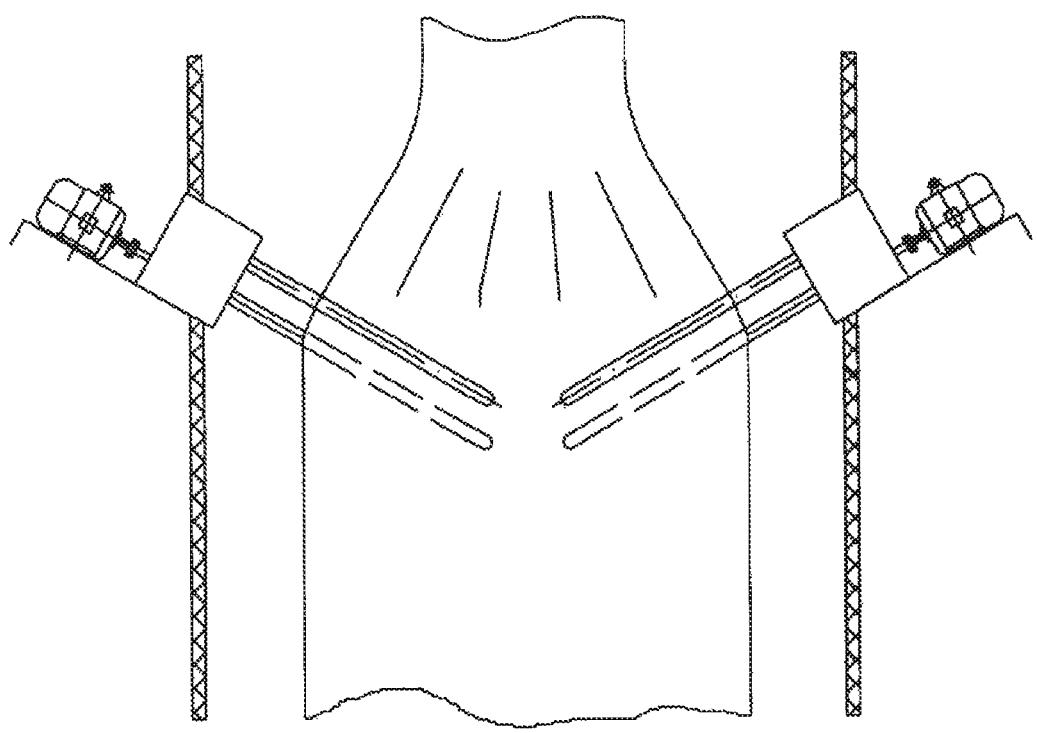
FIG. 1 is a structural schematic view of a spreading device for a foaming furnace in the prior art.

In the drawings, 100: spreading roll group, 110: spreading roll, 111: working section, 112: first mounting portion, 113: supporting section, 114: second mounting portion, 115: transmission section, 115a: roll-driven gear; 200: driving device, 210: driving motor group, 211: first motor, 212: second motor, 212a: shaft-driving gear, 220: transmission shaft, 221: shaft-driven gear, 222: roll-driving gear, 223: shaft sleeve, 231: first gear chain, 232: second gear chain; 300: fixing frame, 310: first mounting seat, 320: second mounting seat, 330: thermal insulation layer.

DETAILED DESCRIPTION

The following are specific embodiments of the present invention, and further describe the technical solutions of the present invention with reference to the accompanying drawings. However, the present invention is not limited to these embodiments.

FIG. 1 shows a spreading device for a foaming furnace in the prior art. In a spreading device for a foaming furnace of the present embodiment, the spreading principle is the same as that in the prior art shown in FIG. 1, and a sheet just semi-molten from a heating section of the foaming furnace is flattened by spreading rolls disposed on both sides.

The spreading device of the present embodiment mainly changes connection and transmission, and achieves improvements in stability, unfolding effect and the like.

Figure 2:
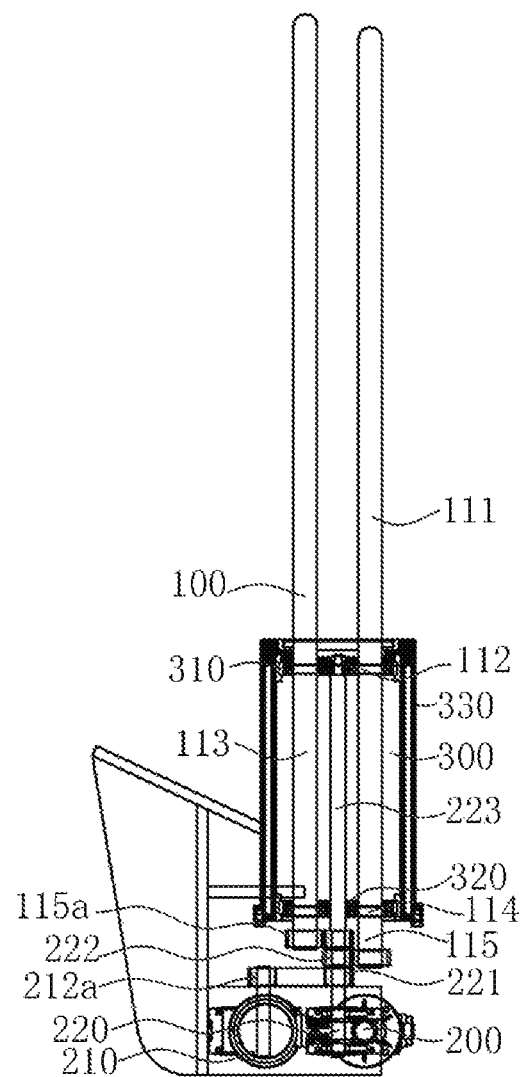
FIG. 2 is a front view of a spreading device for a foaming furnace according to the present invention.

As shown in FIG. 2, the spreading device for a foaming furnace includes a first spreading component and a second spreading component symmetrically mounted on two sides in a hearth of a foaming furnace. Both the first spreading component and the second spreading component are provided with a spreading roll group 100 including at least two spreading rolls 110, and a driving device 200. During working, the driving device 200 drives the spreading roll group 100 to rotate.

In the present embodiment, the first spreading component and the second spreading component are mounted on two sides of a vertical foaming section of the foaming furnace in a manner of being inclined downward relative to a horizontal plane. The spreading roll 110 is made of stainless steel, and an angle between the spreading roll 110 and a furnace wall of the foaming furnace is greater than or equal to 30°.

The spreading roll group 100 includes at least two spreading rolls 110. The spreading roll 110 includes a first mounting portion 112 and a second mounting portion 114, and the first mounting portion 112 and the second mounting portion 114 divide the spreading roll 110 into a working section 111, a supporting section 113 and a transmission section 115.

The transmission section 115 is connected to the driving device 200. The working sections 111 are suspended and respectively disposed on two sides of a sheet so as to clamp the sheet. Each spreading roll 110 rotates inward relative to the sheet (viewed from the transmission section 115 of the spreading roll 110 to the working section 111, the spreading roll 110 on the left side of the sheet should rotate clockwise, and the spreading roll 110 on the right side of the sheet should rotate counterclockwise). Thus, a frictional force is generated, and because the spreading roll 110 is inclined downward relative to a horizontal plane, the generated frictional force is directed toward two sides of the sheet and inclined downward, thereby unfolding the pleated sheet.

In particular, the spreading rolls 110 mounted on two walls of the foaming furnace should be directed to the central axis of the sheet, and the distance between suspended section end points of the two spreading rolls 110 that are opposite to each other should not exceed 20 cm, in order to ensure that all points of the sheet passing through the spreading roll 110 can be pulled, thereby ensuring the overall unfolding quality of the sheet.

A fixing frame 300 is disposed between the spreading roll group 100 and the driving device 200, and the fixing frame 300 includes a first mounting seat 310 and a second mounting seat 320. The first mounting seat 310 is rotationally connected to the first mounting portion 112 of the spreading roll 110, and the second mounting seat 320 is rotationally connected to the second mounting portion 114, so that the supporting section 113 of the spreading roll 110 is mounted in the fixing frame 300. A supporting point and a limiting point are formed at a joint between the mounting portion of the spreading roll 110 and the mounting seat of the fixing frame 300, that is, in addition to connecting and supporting functions provided by the driving device 200 to the transmission section 115 of the spreading roll 110, a supporting force and a pressing force are added to a suspended part of the spreading roll 110, so that the working section 111 suspended in the foaming furnace can be effectively supported and fixed even in rotation, and the suspended end part thereof will not vibrate due to rotation or external force factors, thus ensuring the unfolding quality of the sheet.

In particular, in order to make the suspended working section 111 more stable during rotation, the length of the supporting section 113 (i.e., the distance between the first mounting seat 310 and the second mounting seat 320) should be one third to one half of the length of the working section 111.

The driving device 200 includes a driving motor group 210 and a transmission shaft 220, one end of the transmission shaft 220 is connected to the driving motor group 210, and the other end is mounted on the fixing frame 300 and is connected to the spreading roll group 100.

Figure 4:
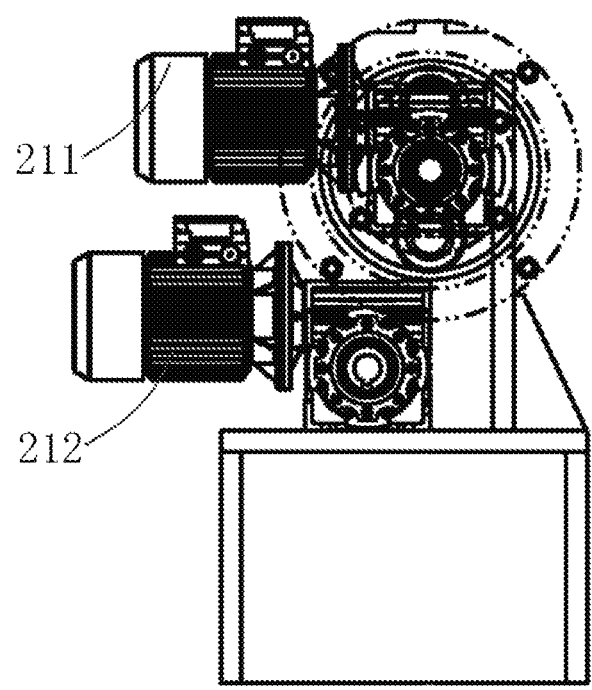
FIG. 4 is a side view of a spreading device for a foaming furnace according to the present invention.
Figure 5:
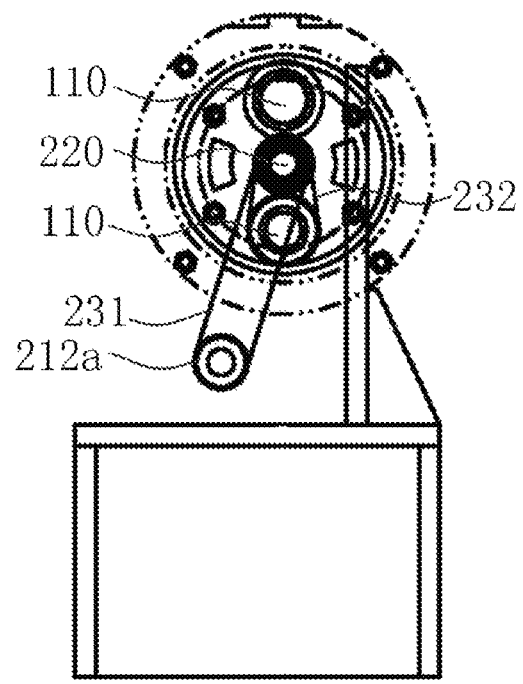
FIG. 5 is a side view of a spreading device for a foaming furnace according to the present invention after a driving motor group is removed.

As shown in FIG. 4 and FIG. 5, the driving motor group 210 includes a first motor 211 and a second motor 212, and a tail end of the transmission shaft 220 is directly connected to the first motor 211. The transmission shaft 220 is also indirectly connected to the second motor 212. That is, the transmission shaft 220 is sleeved with a shaft-driven gear 221, and the shaft-driven gear 221 is connected to a shaft-driving gear 212a on an output shaft of the second motor 212 through a first gear chain 231. On the one hand, the driving effect can be improved when dual motors are working at the same time, and meanwhile, when one of the motors fails, the other motor provides power as a standby motor, which does not affect the working effect of the spreading roll. On the other hand, when the dual motors are working at different time, the two motors provide different rotation speeds and different rotation directions respectively, which improves the applicability and practicability of the spreading device. Meanwhile, the first motor 211 has an excellent transmission effect by adopting a direct transmission manner, the second motor 212 drives the transmission shaft in a chain transmission manner, the chain transmission has a high carrying capacity, and the driving device has a large transmission efficiency even in a high-temperature foaming environment.

Figure 3:
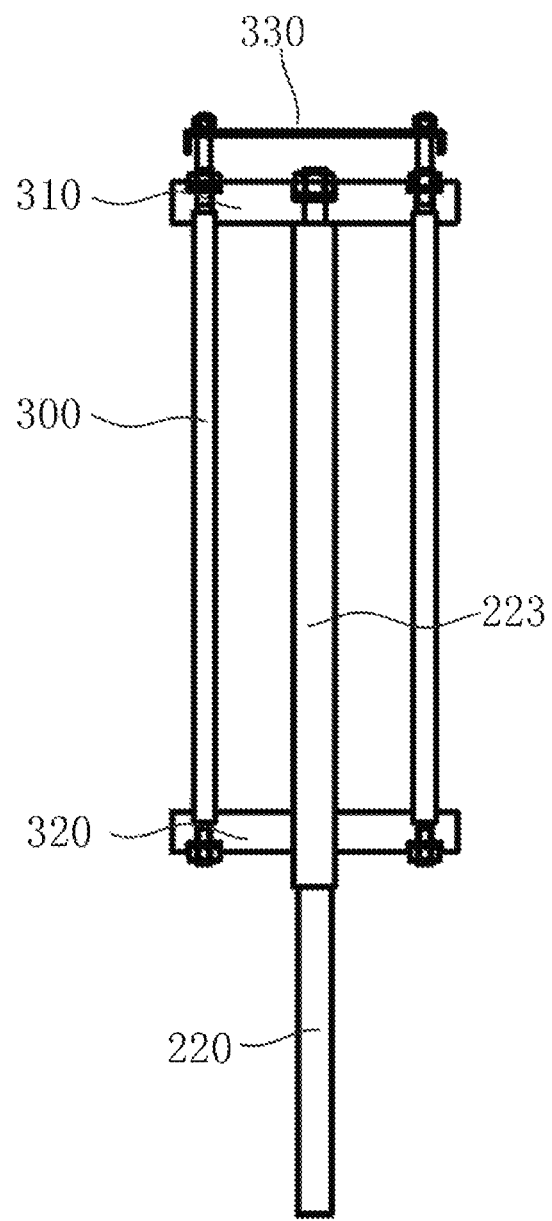
FIG. 3 is a structural schematic view of a fixing frame of a spreading device for a foaming furnace according to the present invention.

As shown in FIG. 3, in particular, the transmission shaft 220 is externally sleeved with a shaft sleeve 223, and a connection end of the shaft sleeve 223 passes through the second mounting seat 320 and is connected to the first mounting seat 310. The transmission shaft 220 is inserted from an insertion end of the shaft sleeve 223, such that the transmission shaft 220 can rotate in the shaft sleeve 223 when being supported by the fixing frame 300, so as to reduce wear.

The transmission shaft 220 is sleeved with a plurality of roll-driving gears 222, and the transmission section 115 of the spreading roll 110 is sleeved with a roll-driven gear 115a. The roll-driven gear 115a on the transmission section 115 of at least one spreading roll 110 is connected to the roll-driving gear 222 on the transmission shaft 220 through a second gear chain 232, the roll-driven gears 115a on the transmission sections 115 of the other spreading rolls 110 are meshed with the roll-driving gears 222 on the transmission shaft 220, and the chain-transmission spreading roll 110 and the gear-transmission spreading roll 110 are disposed on two sides of the sheet respectively. Thus, at least two spreading rolls 110 are driven with the same transmission shaft 220 to make different spreading rolls 110 rotate synchronously at the same speed in different directions. The structure is simple and the spreading effect is improved.

Meanwhile, the driving motor group 210 drives the transmission shaft 220, and then the transmission shaft 220 drives the spreading roll 110. The two-section transmission mode has a transmission buffer function, so that the driving motor group 210 will not immediately affect the working of the spreading roll 110 when it suddenly fails.

In particular, the fixing frame 300 is externally sleeved with a thermal insulation layer 330, and the working section 111 passes through the thermal insulation layer 330 and extends into the foaming furnace. In the conventional foaming furnace design, the working section 111 of the spreading roll 110 is located inside a high-temperature furnace, and the transmission section 115 is located outside a normal-temperature furnace, so that the temperature difference between the head and tail ends of the spreading roll 110 is relatively large, which easily causes damage to the spreading roll 110. The fixing frame 300 and the thermal insulation layer 330 sleeved outside the fixing frame isolate a high-temperature working area inside the foaming furnace and a normal-temperature power area outside the foaming furnace, and the supporting section 113 of the spreading roll 110 in the fixing frame becomes a temperature balance area, which provides a temperature transition for a larger temperature difference between the working section 111 and the transmission section 112 of the spreading roll and balances a temperature environment on the spreading roll 110, thereby prolonging the service life of the spreading roll 110, and reducing the heat loss. Meanwhile, when the spreading component is mounted, the spreading roll group 100 is mounted on the furnace wall of the foaming furnace through the fixing frame 300 and the thermal insulation layer 330, and does not directly contact the furnace wall of the foaming furnace, so as to reduce the frictional wear generated between the rotating spreading roll 110 and the furnace wall, and the damage caused by direct heat transfer between the spreading roll 110 and the high-temperature furnace wall of the foaming furnace.

The entire device of the present invention has a simple structure and a low production cost, but it has a good sheet unfolding effect.

The specific embodiments described herein are merely illustrative of the spirit of the present invention. Those skilled in the art to which the present invention pertains may make various modifications or additions or similar replacements to the described specific embodiments without departing from the spirit of the present invention or beyond the scope defined by the appended claims.

What is claimed is:

1. A spreading device for a foaming furnace, comprising a first spreading component and a second spreading component symmetrically mounted on two sides in a hearth of the foaming furnace, both the first spreading component and the second spreading component comprising a spreading roll group (100) composed of at least two spreading rolls (110), and a driving device (200) for driving the spreading roll group (100), wherein the spreading device further comprises a fixing frame (300), the fixing frame (300) comprising a first mounting seat (310) and a second mounting seat (320); each of the two spreading rolls (110) comprises a first mounting portion (112) and a second mounting portion (114); and the first mounting portion (112) is rotationally connected to the first mounting seat (310), and the second mounting portion (114) is rotationally connected to the second mounting seat (320).

2. The spreading device for a foaming furnace according to claim 1, wherein the driving device (200) comprises a driving motor group (210) and a transmission shaft (220), one end of the transmission shaft (220) is connected to the driving motor group (210), and the other end is mounted on the fixing frame (300) and is connected to the spreading roll group (100).

3. The spreading device for a foaming furnace according to claim 2, wherein the driving motor group (210) comprises a first motor (211), and a tail end of the transmission shaft (220) is connected to the first motor (211).

4. The spreading device for a foaming furnace according to claim 2, wherein the driving motor group (210) comprises a second motor (212), the transmission shaft (220) is sleeved with a shaft-driven gear (221), and the shaft-driven gear (221) is connected to a shaft-driving gear (212a) on an output shaft of the second motor (212) through a first gear chain (231).

5. The spreading device for a foaming furnace according to claim 2, wherein the transmission shaft (220) is externally sleeved with a shaft sleeve (223), and a connection end of the shaft sleeve (223) passes through the second mounting seat (320) and is connected to the first mounting seat (310).

6. The spreading device for a foaming furnace according to claim 5, wherein each of the two spreading rolls (110) is divided by the first mounting portion (113) and the second mounting portion (114) into a working section (111), a supporting section (113) and a transmission section (115), the length of the working section (111) is 2 to 3 times that of the supporting section (113), and the transmission section (115) is sleeved with a roll-driven gear (115a).

7. The spreading device for a foaming furnace according to claim 6, wherein the transmission shaft (220) is sleeved with a plurality of roll-driving gears (222), the roll-driven gear (115a) on the transmission section (115) of at least one of the two spreading rolls (110) is connected to the roll-driving gear (222) on the transmission shaft (220) through a second gear chain (232), and each of the roll-driven gears (115a) on the transmission section (115) of the other one of the two spreading rolls (110) is meshed with the roll-driving gears (222) on the transmission shaft (220).

8. The spreading device for a foaming furnace according to claim 1, wherein the fixing frame (300) is externally sleeved with a thermal insulation layer (330), and each of the two spreading rolls (110) passes through the thermal insulation layer (330) and extends into the foaming furnace.

9. The spreading device for a foaming furnace according to claim 1, wherein each of the two spreading rolls (110) is made of stainless steel.

10. The spreading device for a foaming furnace according to claim 1, wherein an angle between each of the two spreading rolls (110) and a furnace wall of the foaming furnace is greater than or equal to 30°, and each of the two spreading rolls (110) is inclined downward relative to a horizontal plane.

* * * * *